United States Patent [19]

Mosher

[11] Patent Number: 4,768,327
[45] Date of Patent: Sep. 6, 1988

[54] PACKAGING MACHINE WITH VARIABLE SEALING JAW DISPLACEMENT APPARATUS

[75] Inventor: Oren A. Mosher, Hayward, Calif.

[73] Assignee: Package Machinery Company, East Longmeadown, Mass.

[21] Appl. No.: 65,302

[22] Filed: Jun. 22, 1987

[51] Int. Cl.4 .......................... B65B 9/12; B65B 57/00
[52] U.S. Cl. ............................................. 53/451; 53/75; 53/551
[58] Field of Search ................. 53/551, 552, 550, 451, 53/450, 51, 373, 75, 76

[56] References Cited

U.S. PATENT DOCUMENTS

| | | | |
|---|---|---|---|
| 2,915,866 | 12/1959 | Bartlo | 53/552 X |
| 4,532,753 | 8/1985 | Kovacs | 53/551 X |
| 4,537,012 | 8/1985 | Groom et al. | 53/552 |
| 4,546,596 | 10/1985 | Cherney | 53/373 X |
| 4,549,386 | 10/1985 | Wilson | 53/373 X |
| 4,563,862 | 1/1986 | McElvy | 53/552 |

*Primary Examiner*—Horace M. Culver
*Attorney, Agent, or Firm*—McCormick, Paulding & Huber

[57] ABSTRACT

A vertical form, fill and seal packaging machine is characterized by a sealing apparatus which provides for variable sealing jaw displacement having an externally selectable magnitude. The sealing apparatus also includes a displacement sensor for providing feedback signals indicative of a measured sealing jaw displacement.

21 Claims, 2 Drawing Sheets

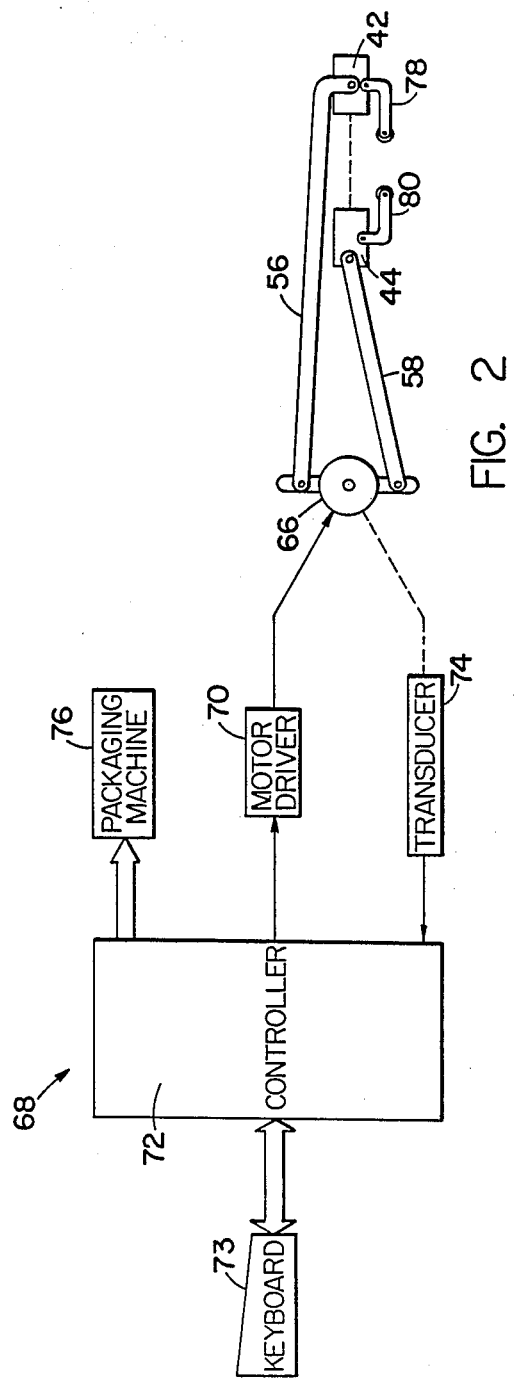

PACKAGING MACHINE WITH VARIABLE SEALING JAW DISPLACEMENT APPARATUS

TECHNICAL FIELD

This invention relates to machinery for forming packages and more particularly to packaging machines having variable sealing jaw displacement.

BACKGROUND OF THE INVENTION

With the advent of combination weighing systems throughput limitations for vertical form, fill and seal packaging (VFFS) machines may result from the limited cycle speed of their sealing jaw closure mechanisms. These mechanisms, such as disclosed in the commonly owned U.S. Pat. Nos. 4,537,012 and 4,040,237, are located in stationary or movable relation below the tube formers in the packaging machines. The sealing jaw mechanisms include a rotary actuator which moves links in opposite directions to open and close the sealing jaws forming the transverse seals in a thermoplastic tube of packaging material. Each sealing operation by the jaws forms the upper end seal of a filled package or bag and the lower end seal of the next package to be filled. An additional function that may be provided by the sealing jaws is that of "stripping" of the contents of the bag away from the transverse seal area. Unlike the bag sealing which mandates full closure of the sealing jaws, "stripping" of the contents of the bag requires only partial closure of the sealing mechanism and movement down the tube to urge the package contents away from the seal area.

Existing sealing mechanisms employ air actuator mechanisms which are only capable of either fully opened or fully closed jaw positioning. Therefore the sealing mechanism must be designed with sufficient jaw opening to accommodate the largest bag to be formed on that packaging machine. A typical ongoing VFFS machine is designed to accommodate packages from one-half ounce to twelve ounces in volume. A one-half ounce package has approximately a one inch flat package width and a tubular diameter of approximately 2.54 inches. Consequently, the sealing jaw opening need be only approximately 3.25 inches for this size package. In contrast, a 12 ounce package has a tube diameter of about 7 inches, which requires sealing jaw openings of between 7.5 and 8 inches. With package sealing jaw actuator mechanisms of the prior art, the sealing jaws are always cycled open to the maximum displacement which substantially reduces packaging cycle speeds and throughput for the smaller packages. Alternatively, the cyclic speed of the prior art machines is increased either by replacing the actuators with smaller actuators providing the appropriate jaw opening or by including mechanically adjusted or installed limit stops. With such alternative means, however, changing of the set up parameters required the machine to be removed from production at least temporarily while the mechanical alterations were made.

In order to accomplish the "stripping" of the package contents, prior art devices commonly employed two actuators, typically air cylinders, and other duplicate hardware to accomplish stepped sealing mechanism movement; first to a strip position and then to a seal position. The actuator's binary or two-state mode of operation (fully open jaws—fully closed jaws) also results in unwanted bouncing of the horizontal sealing jaws at the limits of jaw displacement. As a result, the sealing jaws themselves are worn prematurely while the overall operating speed of the packaging machine is reduced and package seal quality lowered.

SUMMARY OF THE INVENTION

An object of the present invention is to provide a packaging machine sealing apparatus having variably displaceable sealing jaws. Another object of the present invention is to provide a sealing apparatus which determines the actual sealing jaw displacement. A further object of the present invention is to provide a sealing apparatus which will automatically compensate for sealing mechanism element mechanical wear. A further object is to provide a packaging machine in which the sealing jaw displacement can be controlled by programmable input data.

According to the present invention, an apparatus for use in sealing packages formed from a flexible web of packaging material in a VFFS packaging machine includes a pair of opposed moveable elongated sealing jaws. The sealing apparatus includes a means for reciprocally displacing the sealing jaw along an axis by an amount which is dependent on a control signal. Also included is a sealing control system which provides the sealing jaw displacement control signals in dependence on an external signal.

BRIEF DESCRIPTION OF THE DRAWINGS

FIG. 2 is a simplified schematic illustration of an actuator system used with the sealing apparatus of FIG. 1.

DETAILED DESCRIPTION OF THE PREFERRED EMBODIMENT

Figure 1:
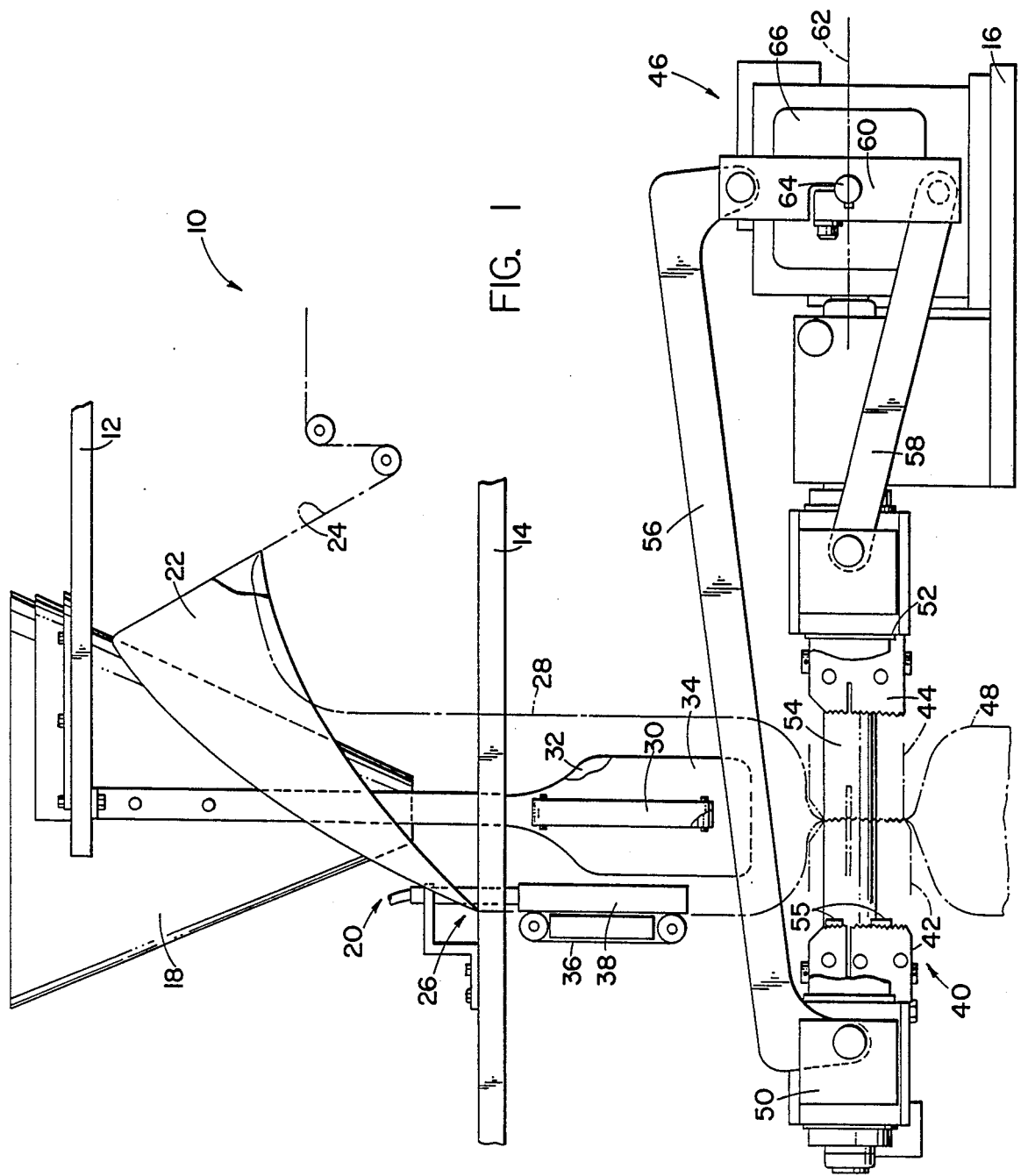
FIG. 1 is a fragmentary side elevational view of a vertical form, fill and seal packaging machine shown schematically including a sealing apparatus embodying the present invention.

Referring now to FIG. 1, there is illustrated a fragmentary seal (VFFS) packaging machine 10, which is generally of a conventional type adapted for forming and filling tubular packages with seals at opposite ends. The VFFS machine 10 includes horizontally disposed spaced frame plates 12, 14 and 16. Upper frame plate 12 supports a funnel shaped hopper 18 which serially receives measured charges of the product to be packaged from a weighing machine (not shown) located above hopper 18. The charges of product fall downwardly into a formed tube of flexible thermoplastic packaging material, described hereinafter, and constitute the contents for a series of packages.

As is well known, a tube forming structure 20 is mounted on the frame plates 12 and/or 14, and includes one piece collar 22. The forming structure receives a web 24 of flexible thermoplastic packaging material or film which is used to first form a tube, and subsequently, the individual packages. Forming collar 22 is configured so that the film web is drawn over the collar and downward within the collar such that the longitudinal edges of the web are drawn to each other at an angle whose apex 26 is at the front of the machine on frame plate 14. As the web is drawn downward from apex 26, the longitudinally extending margins of the web overlap each other in parallel relation, forming the web into the tube 28, as is well known in the packaging art.

Typically the thermoplastic material is drawn over collar 22 by a pair of endless belts 30, one of which is shown in FIG. 1. The belts engage opposite sides of the tube to press it against associated paddle shaped plates 32 supported on the frame plate 12. The plates may be further supported on the funnel or hopper and extend downwardly into the tube 28. Alternatively the paddles may be replaced by a product delivery tube extending downwardly from the funnel. The endless belts operate continuously to effect movement of the web over the collar until a longitudinal seam has been formed therealong by passing the overlapping marginal portions of the web downwardly between a heated belt 36 and back up bar 38 which cooperate in a conventional fashion to heat seal the overlapping marginal portions to each other. The heated belt may be replaced a reciprocating seal bar which moves into the film to seal it.

Sealing apparatus 40 comprises a lower portion of a vertical form, fill and seal packaging machine. The sealing apparatus 40 includes a pair of reciprocating sealing jaws 42 and 44 having serrated surfaces and an actuating mechanism indicated generally at 46 for displacing the jaws towards and away from each other to effect in a preferred embodiment both "stripping" and sealing of the package contents. As described hereinafter with respect to FIG. 2, the sealing apparatus, according to the present invention provides for variable opening of the sealing jaws in a selectable manner.

The sealing apparatus 40 cyclically forms package end seals to the phantom position in FIG. 1 which flattens the tube in the seal area by closing the jaws and heat sealing the two layers of flattened tube to one another. During one closing movement of the jaws, the sealing apparatus 40 simultaneously forms the top end seal of a leading package 48 and the bottom end seal of the following package. A cut-off blade (not shown) or alternatively, a hot wire comprises part of the sealing apparatus 40 and operates while jaws 42 and 44 are closed to cut the web material between the two seals, and thereby separate the leading package 48 from the web tube 28.

In the preferred embodiment opposed jaws 42 and 44 are respectively mounted to first and second draw bars 50 and 52 which slide back and forth between open and closed jaw positions on parallel, horizontally extending rods 54 (only one shown). This configuration is mounted in fixed cantilever position on frame plate 16. The rear jaw 44 is fastened in a fixed position to the rear draw bar and has a longitudinally extending slot which opens in the direction on the other jaw face and receives the cut-off blade. As is also conventional, the front jaw 42 maintains a pair of heating elements 55.

The outboard ends of the draw bars 50, 52 are connected to two sets of operating links, each set including one long link 56 and a somewhat shorter link 58. The long link 56 is pivotably connected to one end of an associated lever 60 while the opposite end of lever 60 is pivotably connected to shorter link 58. The lever's rotational axis is disposed in a horizontal plane defined by the lever's rotational axis and displacement axis 62 of the sealing jaws.

Output shaft 64 of an actuating motor 66 is affixed to the lever for providing rotation about the lever axis. The motor or other actuating mechanism must be selected to provide a repeatable, reliable mechanism for opening and closing the jaws in a variable fashion. As described hereinafter with respect to FIG. 2, the motor 66 or other actuating mechanism of the present invention provides selectively variable or graduated displacement of the sealing jaws in a controlled manner in response to an external control signal.

For certain applications, the vertical form, fill and seal machine must permit partial closure of the jaws to a "stripping" position. Some products, such as potato chips, are sufficiently light and irregular that they do not readily pack together and have a tendency to stack up in a loose array until they occupy portions of the horizontal seal area. Any product captured in the horizontal seal will produce a "leaker", which if detected, must be rejected and the contents be recycled through the packaging machine.

Stripping is performed on a moving jaw packaging machine by bringing the jaw to an almost closed position typically ⅛ to ¼ inch from the fully closed position, and moving either the jaws or stripping bars down the formed tube of packaging material from the middle of the next subsequent bag until the proper seal point is reached. This strips any product out of the seal area and compacts the product in its intended package. Subsequently, the jaws are positioned over the seal area and the sealing operation commences. For most conventional machines, actual contact with the bag itself during stripping is done with a rod or stripping bar resiliently mounted just below the jaws to keep the heated jaws from contacting the bag.

In order to halt vertical movement of the web tube while the jaws are closed, the feed belts and heated belt are stopped. Between successive operations of the jaw sealing apparatus 40, the jaws 42, 44 are opened, the web tube 28 is advanced by the feed belts, the long seam of the package is sealed and a charge of product is loaded into the web tube from a weighing machine (not shown) through the hopper 18.

Although described herein with respect to a vertical form fill and seal machine having paddles or a tube and fixed sealing apparatus those skilled in the art will note that the sealing apparatus provided according to the present invention is not limited thereto. The sealing apparatus provided according to the present invention may be used in other form fill and sealing machines, such as horizontal form, fill and seal machines or machines wherein the sealing mechanism reciprocates parallel to the formed packaging material as an aid in pulling the material through the machine. Also, a sealing apparatus provided according to the present invention comprises a substantially self-contained unit not drivingly connected to any part of the form, fill and seal machine, and therefore, may be constructed as a module readily movable to a different position on the machine frame as may be required to form packages of differing size or shape.

Referring now to FIG. 2, there is schematically illustrated an actuator system 68 used with the sealing apparatus 40 of FIG. 1. With existing sealing mechanisms, the actuator apparatus typically comprises a pneumatic rotary actuator which alternates in operation between two positions causing the lever links and sealing jaw configuration to alternate between a fully closed or fully opened position. This limited displacement capacity produces excess jaw opening when the packaging machine is adapted to form smaller packages. While this limitation was not critical with older weighing machines, with newer, more efficient combination weighing systems, machine throughput, particularly for smaller packages, is limited by the fixed cycle time of the packaging machine. Moreover, the "stripping" required of certain products such as potato chips mandates additional actuating apparatus, since the jaw displacement can not be varied in stepped increments, thereby further reducing the profitability of the machine.

In a sealing apparatus provided by the present invention a conventional jaw actuating mechanism, which only displaces the jaws between two limited positions is replaced with an actuator system which generates reliable variable or graduated displacement of the jaws in response to an external control signal. In the preferred embodiment the actuating system comprises the motor 66, of FIG. 1, preferably a brushless DC servomotor, having a motor driver mechanism 70 which is regulated by a controller 72. The controller is addressable via a control panel or keyboard 73 on controller 72. Through the control panel the operator can preset a number of package machine parameters, and with a sealing apparatus provided according to the present invention the operator can also quickly preset the "jaw opening" at the start of the package machine operation. The capability of a sealing apparatus provided according to the present invention to have jaw opening that can be preset like other packaging parameters marks a point of departure of the present invention over the prior art. Existing sealing mechanisms are characterized by a mechanical restructuring technique either of (1) changing to an actuator cylinder of different size or (2) inserting or adjusting mechanical limit stops on the actuator. Besides being more costly and requiring stoppage of machine operation, these existing techniques do not prevent unwanted jaw bounce at the end of each stroke.

Those skilled in the art will note that other equivalent motor or actuators may be substituted, such as a stepper motor or a reversible motor with a clutch brake coupled to the actuator shaft. In order to provide feedback indicative of the jaw displacement, transducer 74 is positioned on the shaft of the motor. The transducer is one of many known in the art, and can comprise a shaft angle resolver, optical shaft encoding device or rotary potentiometer.

The controller 72 receives signals indicative of the rotational position of the motor shaft, converts those signals in a conventional manner to digital signal equivalent computer signals corresponding to the desired jaw displacement and subsequently generates displacement signals for the motor driver which acts as an interface between the controller and motor. In the preferred embodiment the controller comprises a conventional microproccessor including such memory and signal converters as is necessary to couple the controller to the motor driver and transducer. Other conventional controller means and support apparatus may be equivalently substituted.

As illustrated in FIG. 2, the microprocessor controller comprises part of the overall control apparatus for packaging machine 76. As indicated hereinabove, the operator can preset jaw openings of differing displacement corresponding to packages of various sizes. For example, a typical packaging machine may be designed to form fill and seal potato or corn chip bags from one-half to twelve ounces. If a half-ounce bag is selected the jaws will be programmed to open only approximately 3 to 3.25 inches for that package. However, if a twelve ounce potato chip package has been selected the controller will select a jaw opening of between 7.5 and 8 inches.

The magnitude of the improved throughput can be seen by reference to the following. With one-half ounce corn chip bags a maximum operating speed on most packaging machines is approximately 90 bpm (bags per minute), which corresponds to a 666 millisecond cycle time for sealing mechanism operation. Of this time, approximately 330 milliseconds is spent on jaw close seal and open time, leaving 300 milliseconds to advance the bag. The actual jaw seal time which is the time spent closed on the tube is about 130 to 140 milliseconds, so approximately 200 milliseconds are lost closing the jaws from a distance of about 7 inches. For a packaging machine employing a sealing jaw mechanism according to the present invention the 7 inch distance can be reduced to approximately 3.5 inches, saving approximately 100 milliseconds in displacing the jaws open and closed. Consequently, the cycle time for the sealing mechanism can be reduced to approximately 566 milliseconds with the same seal and fill time, resulting in a throughtput of 106 bpm.

With a sealing apparatus provided by the present invention the actual sealing jaw displacement is accurately known, yielding other advantages. Product stripping as described hereinabove can be incorporated into the overall sealing cycle with stepped or graduated jaw displacement, and thereby eliminate the need for supplementary actuators and other hardware. Additionally, a sealing apparatus provided by the present invention yields substantial savings in energy costs over those of the present art. A sealing apparatus using a binary-type pneumatic actuator will require a 3 to 5 horsepower air compressor running steadily to move the jaws between the maximum fixed limits of displacement. Air consumption of between 15 to 20 scfm is not unusual. With a sealing apparatus provided by the present invention the motor can be reduced to 1 to 1.5 horsepower. Moreover, a servo or stepper motor utilizes power only during operation. In the above example the power needed to open the sealing jaws 3 inches is less than half the power needed to open the sealing jaws 7 inches.

An additional advantage provided by the sealing apparatus of the present invention is minimization of jaw surface wear. Since jaw displacement is precisely known, the controller can generate ramped control signals to turn off or otherwise decelerate the motor prior to jaw contact, preventing the seal jaws from bouncing. The lack of bounce allows for higher operating speeds and produces seals with better quality.

An important safety feature provided by the present invention is the capability for detecting foreign objects located between the jaws. The displacement sensor, such as transducer 74, provides signals which indicate the jaw displacement at any point during the sealing cycle. The controller compares the actual value of displacement with the expected displacement magnitude. If the controller senses that the sealing jaws have not fully closed but have stopped movement, the controller can instruct the motor to stop and reverse direction to open the jaws. Further, the controller can stop the sealing and cutting cycle, protecting the jaw faces and sealing knife from damage and limiting injury if the object was an operator's hand or finger.

In addition to the improvements in energy savings and mechanical wear, a sealing apparatus provided by the present invention eliminates or reduces the need in most applications to "anticipate" the start of the sealing cycle. As is conventional, initiation of the sealing cycle is dependent on signals from a tube position sensor (not shown) which indicates when the tube has fully incremented. Prior sealing mechanisms often started closing the sealing jaws before a package was properly positioned. The higher the cycle speed and the smaller the bag, the greater the magnitude of the needed anticipatory displacement. However, even at low speeds with larger packages, anticipation of tube feed stoppage makes the packaging process more vulnerable to slight deviations in tube feed that result in longer feed times on that cycle. As an example, if the sealing jaws open a full ten inches it may be necessary to anticipate the end of the tube feed by beginning jaw closing approximately 120 milliseconds prior to the end of the tube feed. Any delay in the tube feed cycle will close the sealing jaws prior to the tube stoppage and ruin that package. However, with a sealing apparatus provided by the present invention adequate package machine throughput may be accomplished without reliance on premature sealing jaw closure since the jaw opening has been reduced.

In those very high throughput applications where anticipatory displacement is essential, reliable anticipatory jaw displacement is possible only with a sealing apparatus provided according to the present invention, since the magnitude of the displacement is precisely known. For example, if a packaging machine were operating with one-half ounce corn chips the film web feed could begin before the sealing jaws were opened to the preselected maximum displacement value since the sealed bottom end of the bag is flat and has a width at the bottom of only 1.5 to 2 inches. As this part of the package is fed through the sealing jaws first, the tube feed cycle can begin when the jaws have opened of approximately 1.5 to 2 inches.

A sealing apparatus provided according by the present invention will also improve the stripping process. Previously, the pair of rods, bars or blades (78,80) which were closed above the jaw to an approximate 2 to 3 millimeter opening or separation could be damaged by premature closing or incorrect positioning of the sealing jaws. Since the displacement between sealing jaws is accurately known at all times with the present invention, the controller will compare actual jaw displacement with an expected value to ensure that jaw displacement is correct. A sensor, such as a proximity Hall effect or photo-electric device, can be used to sense strip rod movement to a position below the sealing jaws.

As detailed hereinabove, a controller provided by the present invention compares the magnitude of the actual jaw displacement with signals corresponding to the desired displacement to determine a displacement error. If, for example, the jaws have overshot or otherwise been positioned at an incorrect displacement, the controller will provide an iterative adjustment loop after each displacement cycle to adjust the measured opening jaw to the previously selected displacement value. If a jaw opening of approximately 3 inches is desired and a motor has a stopping distance of approximately 0.5 inches, the controller will turn off the motor at the point at which the sealing jaws reach an approximate 2.5 inch displacement. Note further that as the mechanism's elements mechanical wear, the actual jaw displacement will vary significantly from the desired displacement value. The adjustment loop detailed above executed by the controller will automatically compensate for such mechanical wear.

Although described hereinabove with respect to a preferred embodiment those skilled in the art will note that certain additions, deletions and substitutions thereto may be made therein without departing from the spirit and scope of the invention.

I claim:

1. An apparatus for use in sealing package tubes formed from a web of flexible packaging material in a packaging machine that forms, fills and seals packages, comprising:
   a pair of opposed, movable elongated sealing jaws;
   means for reciprocally displacing said sealing jaws along an axis between open and closed positions by a magnitude dependent on a control signal;
   sealing control means for generating said sealing jaw displacement control signals in dependence on an external signal indicative of a selected sealing jaw open position and corresponding jaw displacements.

2. The apparatus of claim 1 wherein said sealing jaw displacing means comprises a reversible motor with clutch brake coupling apparatus.

3. The apparatus of claim 1 wherein said sealing jaw displacing means comprises a stepper motor.

4. The apparatus of claim 1 wherein said sealing control means comprises a microprocessor.

5. The apparatus of claim 1 wherein said sealing control means further comprises an addressable control panel for providing said external control signals.

6. The apparatus of claim 5 wherein said addressable control panel includes input means for presetting said sealing jaw displacement.

7. The apparatus of claim 1 further comprising means for iteratively determining a sealing jaw displacement error and providing corresponding corrective supplemental sealing jaw displacement signals.

8. The apparatus of claim 7 wherein said sensor means comprises a shaft encoder device.

9. The apparatus of claim 1 wherein said sealing control means further comprises displacement sensor means for providing feedback signals indicative of a measured sealing jaw displacement.

10. The apparatus of claim 8 wherein said sensor means further comprises a rotary potentiometer.

11. The apparatus of claim 10 wherein said sealing control means further comprises motor driver means for interfacing said displacement signals to said servomotor.

12. The apparatus of claim 1 wherein said sealing jaw displacing means comprises a brushless D.C. servomotor.

13. A method of sealing package tubes formed from a web of flexible package material in a packaging machine that forms, fills and seals packages, said packaging machine including a pair of opposed moveable elongated sealing jaws, comprising the steps of:
   reciprocally displacing the sealing jaws along an axis between open and closed positions by an amount dependent on a control signal; and
   generating said sealing jaw control signals in dependence on external signals indicative of a selected sealing jaw open position and corresponding jaw displacements.

14. The method of claim 13 further comprising the steps of providing feedback signals indicative of a measured sealing jaw displacement.

15. The method of claim 13 further comprising the iterative steps of determining a sealing jaw displacement error and providing corresponding supplemental corrective sealing jaw displacement signals.

16. The method of claim 13 wherein said packaging machine further includes a pair of opposed, movable, elongated stripping rods, and wherein said method further comprises the steps of;
   displacing the stripping rods towards each other from an outer first position to inner second position contacting the package tube;
   advancing the stripping rods along the package tube;
   sensing the strip rod advancement to a position beyond the package seal area; and
   displacing the stripping rods back to said first stripping rod position.

17. The method of claim 16 further comprising the step of retracting the stripping rods along the tube above the package seal area.

18. The method of claim 16 further comprising the steps of generating stripping rod control signals in dependece on signals indicative of a desired stripping rod displacement.

19. The method of claim 18 further comprising the steps of providing feedback signals indicative of a measured stripping rod displacement.

20. The method of claim 19 further comprising the iterative steps of determining a stripping rod displacement error and providing corresponding supplemental corrective stripping rod displacement signals.

21. A apparatus in a vertical form, fill and seal packaging machine for sealing packages formed from sealable packaging material comprising:
   a pair of oppositely disposed sealing jaws mounted in the packaging machine for reciprocating movement toward and away from each other between open and closed position and relative to packaging material passing between the jaws for sealing;
   controlled motor means connected to the pair of sealing jaws for producing the reciprocating movement of the jaws with displacements that are variable with and dependent upon an external control signal and
   control means in the packaging machine connected with the controlled motor means for producing the variable external control signal in accordance with selected sealing jaw open positions and corresponding jaw displacements.

* * * * *